United States Patent
Paulson et al.

(10) Patent No.: US 11,524,263 B1
(45) Date of Patent: Dec. 13, 2022

(54) FILTRATION PROCESSES AND SYSTEMS

(71) Applicant: WIGEN COMPANIES, INC., Chaska, MN (US)

(72) Inventors: Eric Paulson, Chaska, MN (US); Eric Geibel, Chaska, MN (US); Michael Bourke, Denver, CO (US); Jeff W. Wigen, Chaska, MN (US)

(73) Assignee: WIGEN COMPANIES, INC., Chaska, MN (US)

( * ) Notice: Subject to any disclaimer, the term of this patent is extended or adjusted under 35 U.S.C. 154(b) by 147 days.

(21) Appl. No.: 16/989,142

(22) Filed: Aug. 10, 2020

Related U.S. Application Data

(60) Provisional application No. 62/887,573, filed on Aug. 15, 2019.

(51) Int. Cl.
*B01D 61/22* (2006.01)
*B01D 61/14* (2006.01)
(Continued)

(52) U.S. Cl.
CPC ........... *B01D 61/22* (2013.01); *B01D 61/145* (2013.01); *B01D 61/16* (2013.01); *B01D 61/18* (2013.01);
(Continued)

(58) Field of Classification Search
CPC ...... B01D 61/22; B01D 61/145; B01D 61/16; B01D 61/18; B01D 63/046; B01D 65/02;
(Continued)

(56) References Cited

U.S. PATENT DOCUMENTS 6,001,254 A * 12/1999 Espenan ................ B01D 61/22
 210/90
6,841,069 B2 1/2005 Nakayama et al.
(Continued)

FOREIGN PATENT DOCUMENTS

EP 1743690 A1 * 1/2007
WO WO 2018/130394 A1 7/2018

OTHER PUBLICATIONS

English language machine translation of EP1743690A1, 8 pages, No Date.*

(Continued)

*Primary Examiner* — Pranav N Patel
(74) *Attorney, Agent, or Firm* — Jeffrey L. Wendt; The Wendt Firm, P.C.

(57) ABSTRACT

Water or wastewater filtration processes and systems have a plurality of membrane modules, each having filter media therein, the plurality of membrane modules arranged in parallel fluid flow, a main bottom feed conduit, a main top feed conduit, and separate feed conduits fluidly connecting the main bottom feed conduits and the main top feed conduits to respective membrane modules. A main filtrate conduit, and separate filtrate conduits fluidly connect respective membrane modules to the main filtrate conduit. A backwash conduit fluidly connects the main filtrate conduit to respective membrane modules through the main top and bottom feed conduits. A pump having a pump feed conduit and a pump discharge conduit, the pump discharge conduit fluidly connected to the main top and bottom feed conduits, and a plurality of automatically controllable valves positioned in the main top and bottom feed conduits, the main filtrate conduit, the pump discharge conduit, and the backwash conduit, with a controller configured to actuate the plurality of automatically controllable valves to control feed and backwash flows through the membrane modules using (Continued)

pressure developed only by the pump. The pump is preferably operated by a variable-speed prime mover.

20 Claims, 7 Drawing Sheets

(51) Int. Cl.

| | |
|---|---|
| B01D 61/16 | (2006.01) |
| B01D 63/04 | (2006.01) |
| B01D 65/02 | (2006.01) |
| B01D 69/02 | (2006.01) |
| B01D 69/08 | (2006.01) |
| B01D 69/12 | (2006.01) |
| B01D 71/60 | (2006.01) |
| B01D 71/82 | (2006.01) |
| C02F 1/44 | (2006.01) |
| B01D 61/18 | (2006.01) |
| C02F 101/20 | (2006.01) |

(52) U.S. Cl.
CPC ......... *B01D 63/046* (2013.01); *B01D 65/02* (2013.01); *B01D 69/02* (2013.01); *B01D 69/08* (2013.01); *B01D 69/12* (2013.01); *B01D 71/60* (2013.01); *B01D 71/82* (2013.01); *C02F 1/442* (2013.01); *B01D 2311/04* (2013.01); *B01D 2311/25* (2013.01); *B01D 2313/18* (2013.01); *B01D 2313/243* (2013.01); *B01D 2317/04* (2013.01); *B01D 2317/06* (2013.01); *B01D 2321/04* (2013.01); *B01D 2325/02* (2013.01); *B01D 2325/34* (2013.01); *C02F 2101/20* (2013.01); *C02F 2201/005* (2013.01); *C02F 2209/40* (2013.01); *C02F 2301/046* (2013.01); *C02F 2303/16* (2013.01)

(58) Field of Classification Search
CPC ........ B01D 69/02; B01D 69/08; B01D 69/12; B01D 71/60; B01D 71/82; B01D 2311/04; B01D 2311/25; B01D 2313/18; B01D 2313/243; B01D 2317/04; B01D 2317/06; B01D 2321/04; B01D 2325/02; B01D 2325/34; C02F 1/442; C02F 2101/20; C02F 2201/005; C02F 2209/40; C02F 2301/046; C02F 2303/16

See application file for complete search history.

(56) References Cited

U.S. PATENT DOCUMENTS

| | | | |
|---|---|---|---|
| 7,875,179 | B2 | 1/2011 | Suzuki et al. |
| 8,318,020 | B2 | 11/2012 | Kando et al. |
| 8,641,904 | B2 | 2/2014 | Kanaya et al. |
| 8,697,834 | B2 | 4/2014 | Schaub et al. |
| 9,868,091 | B2 | 1/2018 | Tsukamoto et al. |
| 2005/0067341 | A1* | 3/2005 | Green .............. B01D 61/12 |
| | | | 210/321.69 |
| 2007/0210001 | A1 | 9/2007 | Kanaya et al. |
| 2007/0215544 | A1 | 9/2007 | Kando et al. |
| 2010/0051544 | A1* | 3/2010 | Berg ................. C02F 1/44 |
| | | | 210/636 |
| 2014/0163199 | A1 | 6/2014 | Hueffer et al. |
| 2020/0001237 | A1 | 1/2020 | Kadokawa et al. |

OTHER PUBLICATIONS

BASF/inge® dizzer® XL 0.9 MB 70 WT UF Membrane Pilot Testing for City of Ashland, OR, Pilot Report Final, pp. 1-31, Oct. 6-Dec. 12, 2017, Germany.
BASF, "iSD—inge System Design" brochure, pp. 1-2, 2013, Germany.
BASF, "Multibore Membranes" brochure, pp. 1-2, 2013, Germany.
Inge Gmbh, "T-Rack 3.0" brochure, pp. 1-6, 2016, Germany.
Inge Gmbh, "T-Rack Manifold" brochure, pp. 1-2, 2013, Germany.
Inge Gmbh, "Dizzer P" brochure, pp. 1-5, 2017, Germany.

* cited by examiner

FILTRATION PROCESSES AND SYSTEMS

CROSS-REFERENCE TO RELATED APPLICATIONS

This application is entitled to and claims the benefit of earlier filed provisional application Ser. No. 62/887,573, filed Aug. 15, 2019, under 35 U.S.C. § 119(e), which earlier filed provisional application is incorporated by reference herein in its entirety.

BACKGROUND INFORMATION

Technical Field

The present disclosure relates to processes and systems for water and wastewater filtration. In particular, the present disclosure relates to processes and systems featuring membrane filters that may be operated to produce filtrate and periodically backwashed using a dedicated operating pump.

Background Art

Presently, ultrafiltration (UF) membrane systems, microfiltration membrane systems, and other membrane separators employ dedicated feed and backwash pumps. In many instances these systems employ large backwash pumps and large diameter piping to handle the high backwash flow rates needed in a conventional system. Normal operation of these conventional systems requires the feed pumps and backwash pumps to be frequently cycled on and off, which causes pump maintenance issues over time. It would be desirable to have a feed pump dedicated to each train to operate more efficiently with that pump, with no pump shutdowns needed during normal operation. It would further be desirable to reduce capital costs by removal of a backwash system, with the large tank, pumps, piping, and valves needed on a conventional UF system.

The majority of the existing UF membrane innovation today relates to the design of the membrane materials and membrane forms (for example multichannel vs. single channel fiber membranes) and to space saving systems, such as the membrane separation systems known under the trade designation T-RACK employing multiple membrane modules known under the trade designation DIZZER, each membrane module including multiple multichannel fiber membranes known under the trade designation MULTI-BORE, all available commercially from Inge BASF. Multichannel membranes are also disclosed in published PCT patent application WO2018/130394A1, assigned to BASF, incorporated by reference herein.

It would therefore be advantageous to provide improved filtration processes and systems permitting the use of all membrane types (single channel fiber, multichannel fiber, spiral wound, and the like) employing one or more polymeric membrane materials (such as disclosed in the '394 published PCT patent application) with reduced pump maintenance issues and increased pump efficiency. It would further be advantageous to provide processes and systems exhibiting reduced backwash volumes in comparison to conventional systems employing the same number of membrane modules, and with reduced capital expense for backwash pumps, backwash tanks, and backwash piping. It would further be an advance in the art if processes and systems were provided that could handle upset conditions that may cause (in conventional systems) sudden and rapid increase in solids loading due to upset upstream processes.

As may be seen, current practice may not be adequate for all circumstances, and may result in one or more deficiencies as noted above. There remains a need for more robust filtration processes and systems. The processes and systems of the present disclosure are directed to these needs.

SUMMARY

In accordance with the present disclosure, processes and systems are described which reduce or overcome many of the faults of previously known processes and systems.

A first aspect of the disclosure are systems, one system embodiment comprising (or consisting essentially of, or consisting of) a water or wastewater filtration system comprising:

a) a plurality of membrane modules, each having filter media therein, the plurality of membrane modules arranged in parallel fluid flow,
b) a main bottom feed conduit;
c) a main top feed conduit;
d) separate feed conduits fluidly connecting the main bottom feed conduits and the main top feed conduits to respective membrane modules,
e) a main filtrate conduit, and separate filtrate conduits fluidly connecting respective membrane modules to the main filtrate conduit;
f) a backwash conduit fluidly connecting the main filtrate conduit to respective membrane modules through the main top and bottom feed conduits;
g) a pump having a pump feed conduit and a pump discharge conduit, the pump discharge conduit fluidly connected to the main top and bottom feed conduits;
h) a plurality of automatically controllable valves positioned in the main top and bottom feed conduits, the main filtrate conduit, the pump discharge conduit, and the backwash conduit;
i) a controller configured to actuate the plurality of automatically controllable valves to control feed and backwash flows through the membrane modules using pressure developed only by the pump; and
j) a variable-speed prime mover for operating the pump.

In certain embodiments each of the plurality of membrane modules may be positioned vertically or substantially vertically (within about 15 degrees of vertical). In certain embodiments each of the membrane modules may comprise a body having a length (L), a diameter (D), and a longitudinal axis (LA). In certain embodiments the length (L) and diameter (D) of each of the plurality of membrane modules may be equal for all of the plurality of membrane modules. In certain embodiments at least some of the plurality of filter media may comprise UF filter media, preferably the UF filter media in each of the plurality of membrane modules may comprise multichannel or multibore polymer fiber membranes. In certain embodiments the multichannel or multibore polymer fiber membranes may comprise A.) a carrier membrane CM, wherein said carrier membrane CM has a porous structure wherein the average pore diameter on one surface is smaller than in the rest of the membrane, thus forming rejection layers R on one side of carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM. In certain embodiments the polymer fiber membrane may have a molecular weight cut-off above 3,000 Da and may comprise A. a carrier membrane CM, wherein said carrier membrane CM has a porous structure wherein the average pore diameter on one surface is smaller than in the rest of the membrane, thus forming rejection layers R on one side of carrier membrane CM, and B. an active layer A comprising at least one polymer P selected from linear or branched polyethyleneimine (PEI), wherein said active layer A is located on the surfaces of the rejection layers R of carrier membrane CM and throughout the porous structure of carrier membrane CM. In certain embodiments the system may have one or more trains of membrane modules, each train having N rows of membrane modules, wherein each row of membrane modules may be successively backwashed with filtrate while the remaining rows operate in filtration mode, all controlled by the plurality of automatically controllable valves and the controller, the pump and variable-speed prime mover. In certain embodiments the systems may comprise two or more filter trains, for example, two or more filter trains each having substantially the same filter media arranged in parallel flow relationship, or two or more filter trains having the same or different filter media arranged in series flow relationship, or combinations of parallel and series arrangements. In certain embodiments, a single filter train may be employed. Embodiments are also contemplated where the filter media comprises a plurality of fiber membranes, each fiber membrane having one or more channels. The channels may be substantially the same or different in inside diameter.

A second aspect of the disclosure are processes for treating water or wastewater, one process embodiment comprising (or consisting essentially of, or consisting of):
a) flowing a feed water composition comprising water and impurities into the membrane modules;
b) producing a filtrate stream by generating a pressure differential across the filter media, causing water in the feed water composition to flow from inside to outside of the filter media; and
c) backwashing a first portion of the plurality of membrane modules while a second portion of the plurality of membrane modules operate in filtration mode, using only the pump for pressure during filtration and backwashing operations.

Certain process and system embodiments of this disclosure may operate in modes selected from the group consisting of automatic continuous mode, automatic periodic mode, and manual mode. In certain embodiments the pump may be driven by one or more prime movers selected from the group consisting of pneumatic, electric, fuel, hydraulic, and combinations thereof. It will also be appreciated that in certain embodiments, one or more of the one or more control valves may cycle between open and closed states, and movement between open and closed may be continuous, periodic, or oscillatory. The direction of flow through the filter modules is not limited, and, for example may be, but is not limited to transverse, longitudinal, or other orientation to the module longitudinal axis. In certain embodiments the filter modules may be arranged vertically, that is, the longitudinal axis of each filter module is substantially vertical, and in this arrangement when using channeled fiber membranes the feed may be caused to flow upward or downward through any given module, although in certain embodiments all modules may have the same flow pattern.

These and other features of the processes and systems of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein, and vice versa. It should be further understood that wherever the term "comprising" is used herein, other embodiments where the term "comprising" is substituted with "consisting of" are explicitly disclosed herein, and vice versa. Moreover, the use of negative limitations is specifically contemplated; for example, certain systems may include a redundant backup pump, and/or a cleaning composition supply vessel and supply conduit fluidly attached to the pump suction, while other systems may be devoid of these features. In certain embodiments the filter media may be devoid of certain chemical species, for example, polymeric material devoid of phenyl groups, or devoid of certain metals, such as lead (Pb). As another example, a system may be devoid of any pump except the feed pump which also serves as the backwash pump. Other systems may be devoid of metal fittings, or devoid of metal fittings that are not corrosion protected, such as by one or more coatings.

BRIEF DESCRIPTION OF THE DRAWINGS

The manner in which the objectives of this disclosure and other desirable characteristics can be obtained is explained in the following description and attached drawings in which.

Figure 1:
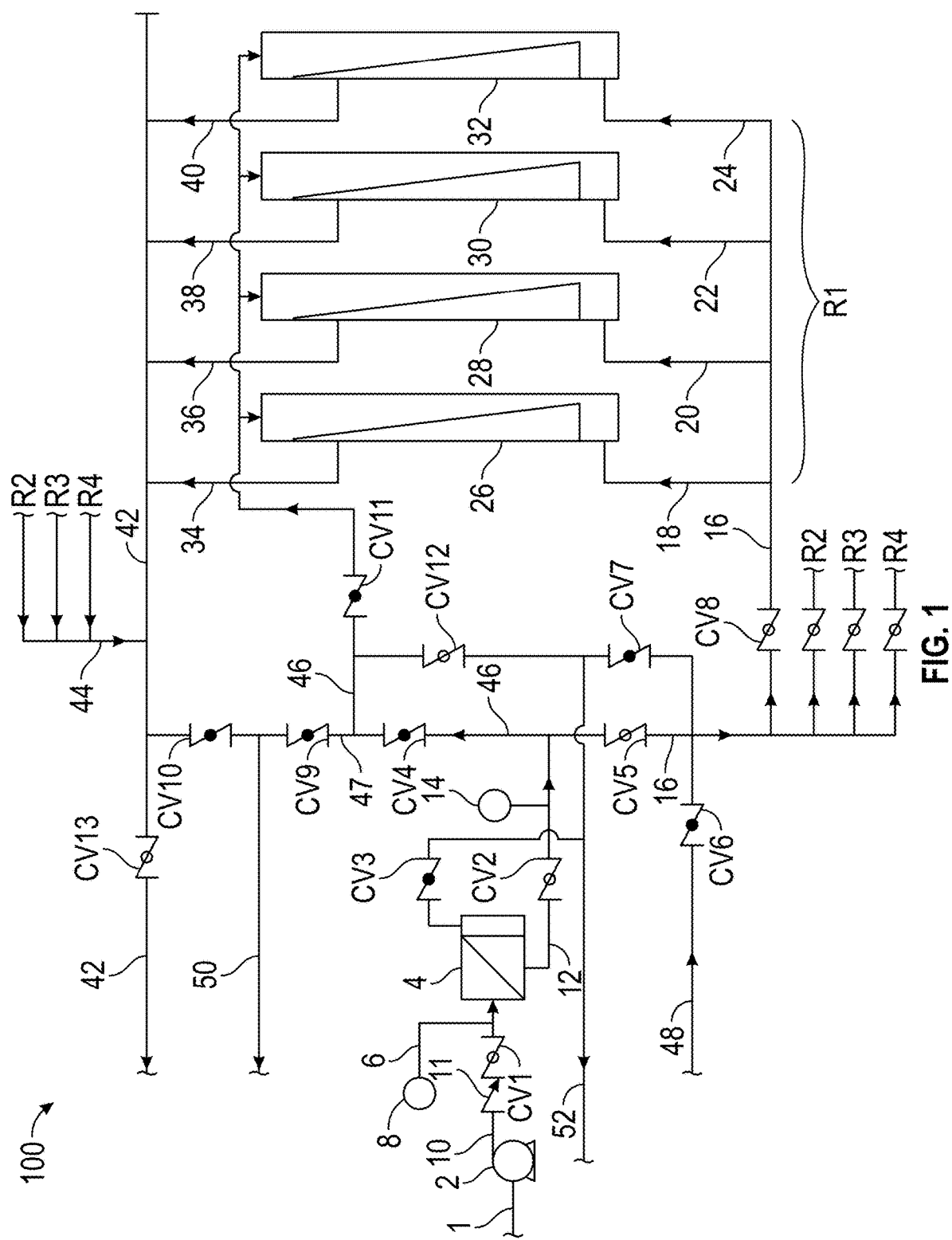
FIG. 1 is a high-level schematic process flow diagram of one system and process in accordance with the present disclosure.

It is to be noted, however, that the appended drawings are not to scale, and illustrate only typical system and process embodiments of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the processes and systems of the present disclosure. However, it will be understood by those skilled in the art that the apparatus, processes and systems disclosed herein may be practiced without these details and that numerous variations or modifications from the described embodiments may be possible. All technical articles, U.S. and non-U.S published and non-published patent applications in the English language, standards, U.S. patents, U.S. statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on volume and all test methods are current as of the filing date hereof. The acronym "ASTM" means ASTM International, 100 Barr Harbor Drive, PO Box C700, West Conshohocken, Pa., 19428-2959 USA.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k*(RU-RL)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all systems, processes, and compositions claimed herein through use of the term "comprising" may include any additional component, step, additive, adjuvant, or compound whether monomeric, oligomeric, polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As mentioned herein, one of the challenges in operating presently known water and wastewater filtration systems, and especially UF systems and processes, is they require the feed pumps and backwash pumps to be frequently cycled on and off, which causes pump maintenance issues over time. It would be desirable to have a feed pump dedicated to each train to operate more efficiently with that pump, with no pump shutdowns needed during normal operation. It would further be desirable to reduce capital costs by removal of a backwash system, with the large tank, pumps, piping, and valves needed on a conventional UF system.

Figure 2A:
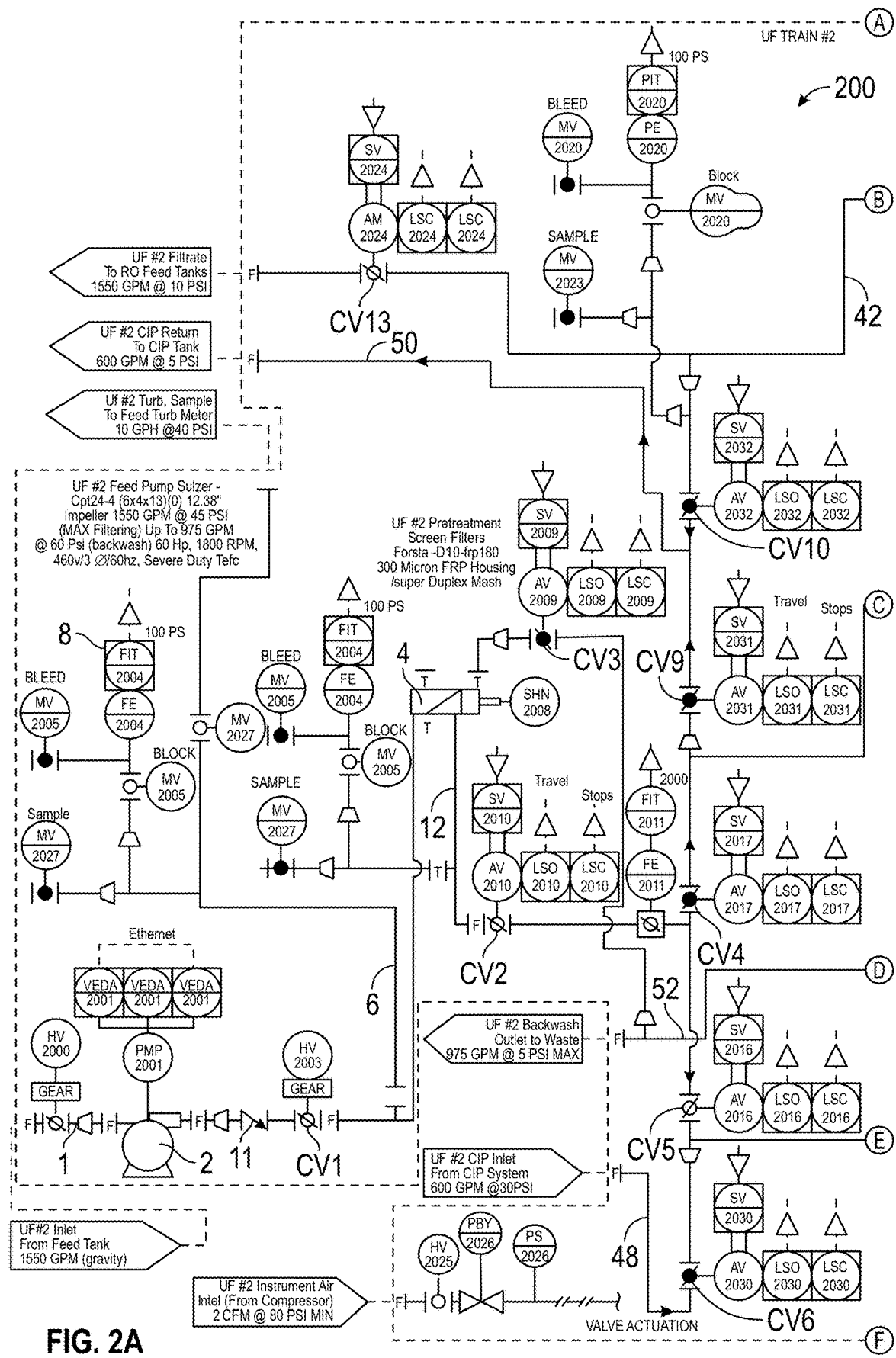
FIGS. 2A and 2B present a detailed schematic P&ID (piping and instrumentation) diagram for one system and process in accordance with the present disclosure.
Figure 2B:
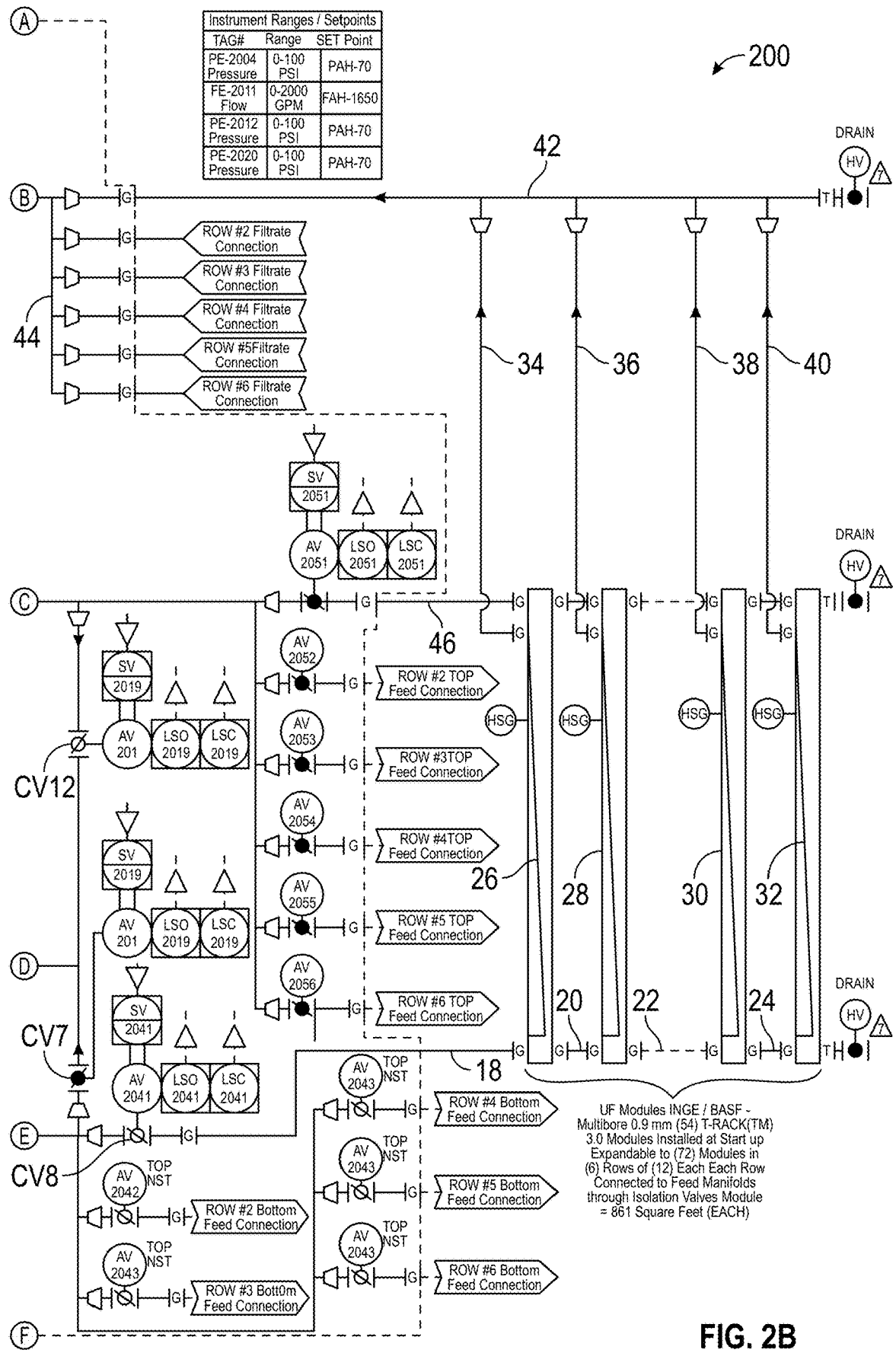
Figure 3:
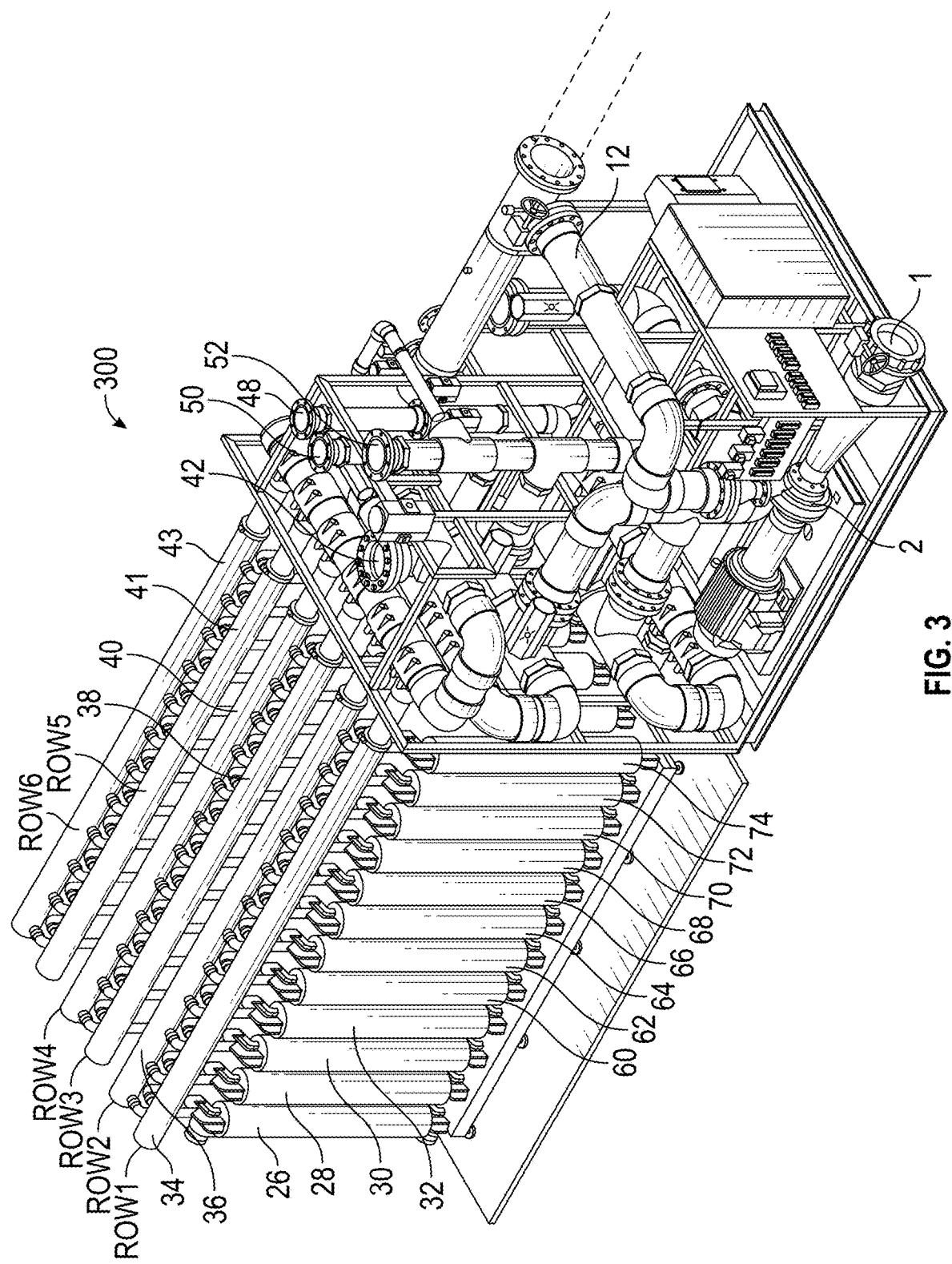
FIGS. 3, 4, 5, and 6 are perspective, plan, side elevation, and end elevation views, respectively, of another system embodiment in accordance with the present disclosure.
Figure 4:
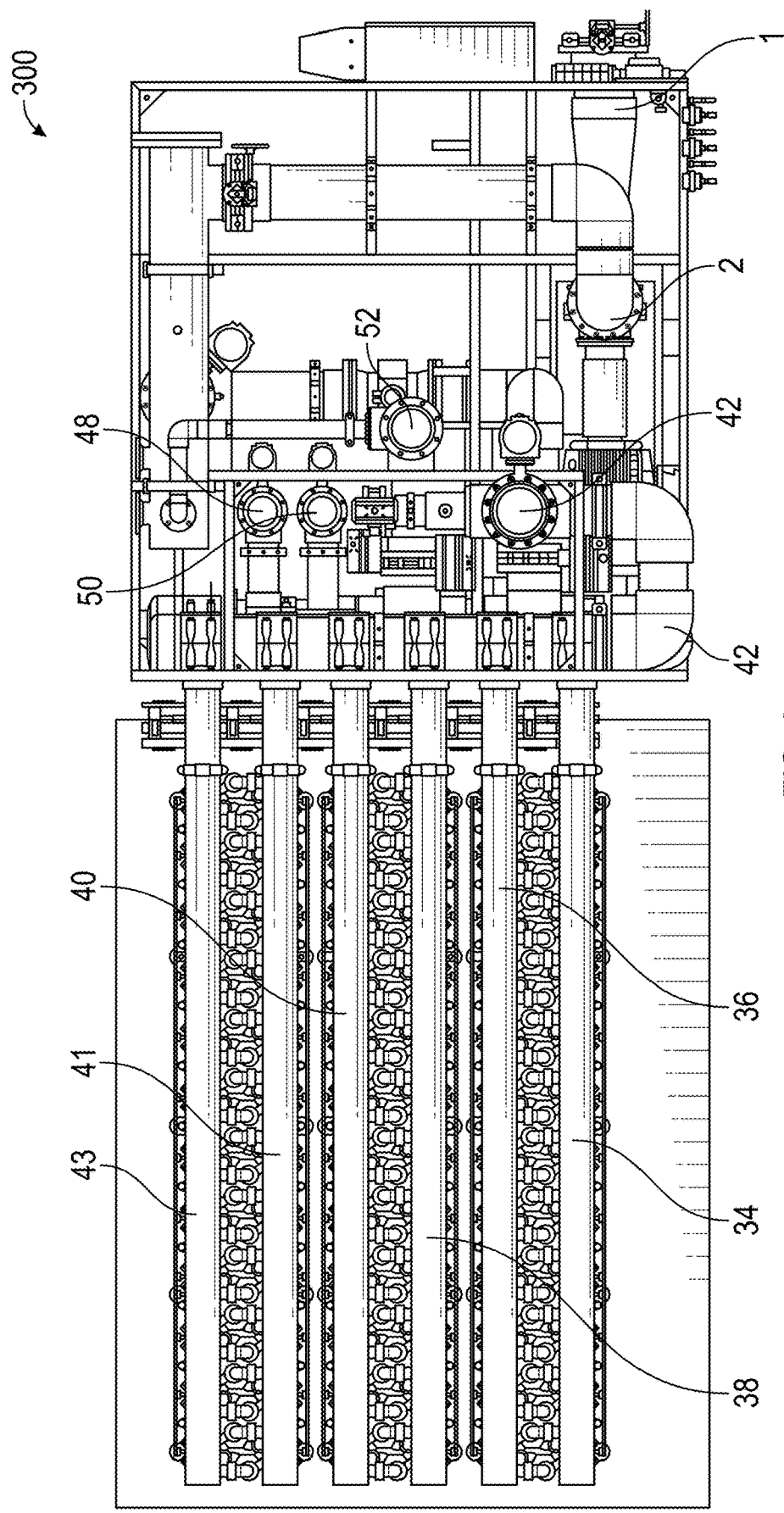
Figure 5:
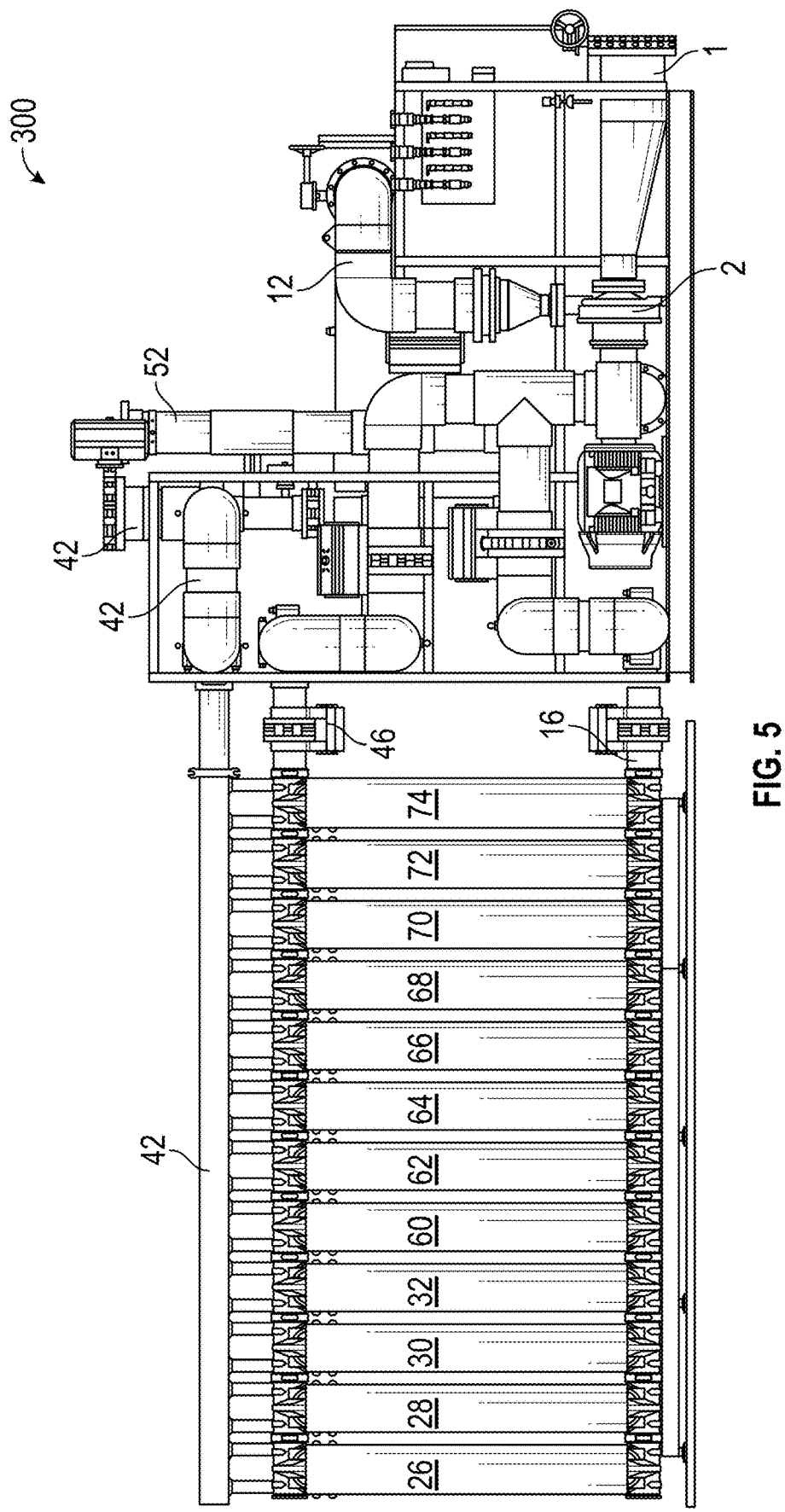
Figure 6:
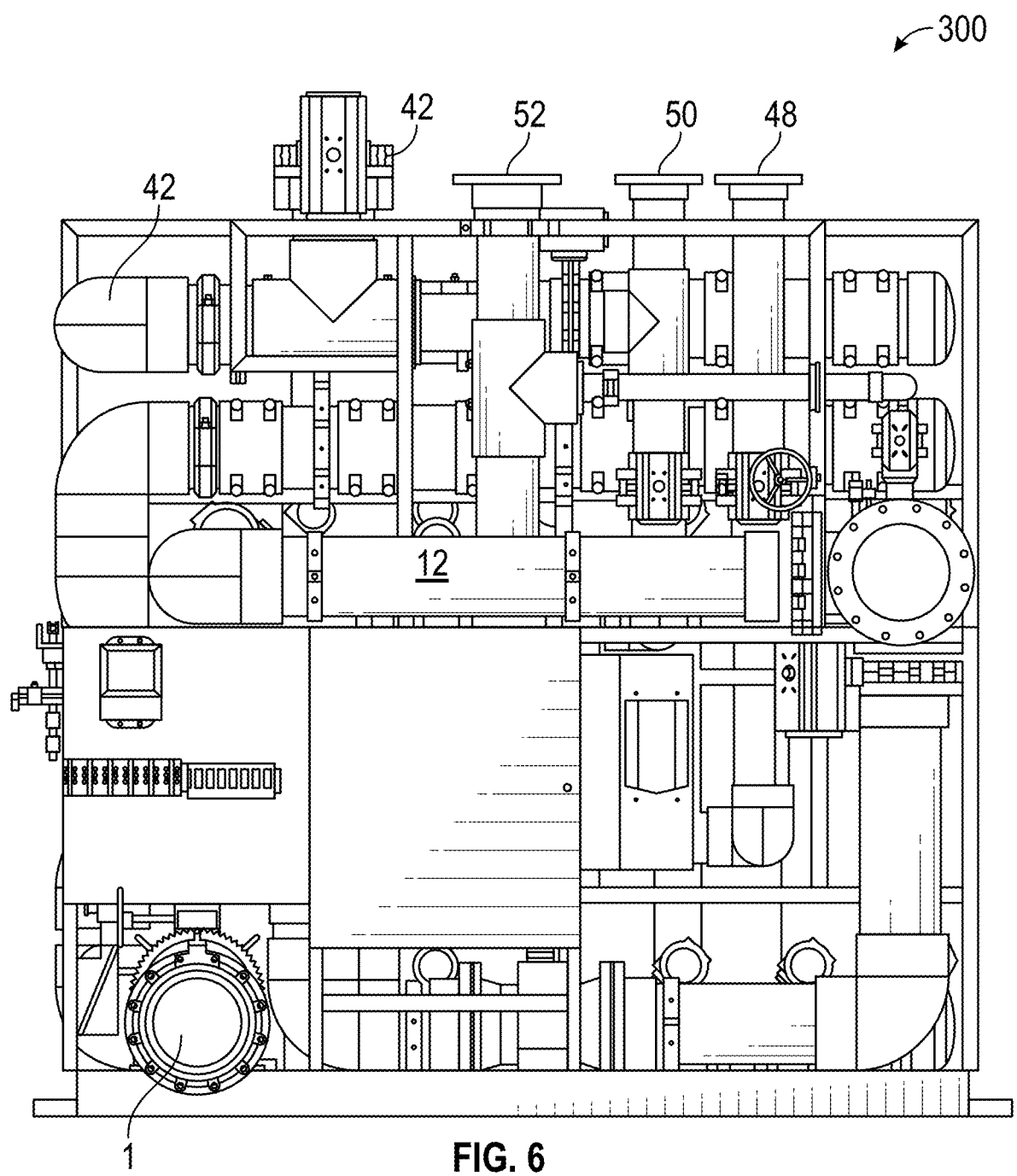

The processes and systems of the present disclosure present a unique backwashing scheme using membrane modules, for example, but not limited to the membrane modules known under the trade designation DIZZER Inside/Out Ultrafiltration (UF) membrane modules available commercial from BASF/Inge. FIG. 1 is a high-level schematic process flow diagram of one system and process in accordance with the present disclosure. FIGS. 2A and 2B present a detailed schematic P&ID diagram for the system and process in accordance with FIG. 1, and FIGS. 3, 4, 5, and 6 are perspective, plan, side elevation, and end elevation views, respectively, of a 6×12 embodiment (6 rows, each row having 12 UF modules).

There are many applications for such membrane modules, but in certain embodiments a plurality of membrane modules are arranged in "trains", which is simply a convenient expression of a plurality of membrane modules arranged in parallel flow relationship. Some background and explanation of potential advantages and disadvantages of two possible embodiments of the present processes and systems are now discussed in relation to the drawing figures.

In one embodiment 100, referring to FIG. 1, a dedicated pump 2 is used for all filtering and backwashing operations on individual UF system trains, thus eliminating the need for separate feed pumps and backwash pumps. Pump 2 takes feed from a feed tank through a feed conduit 1, and discharges through a pump discharge conduit 10, which further includes a check valve 11 and first control valve CV1. (Control valves are indicated as "normally open" with an open circle, and "normally closed" with a shaded circle.) Pump discharge conduit 10 fluidly connects pump 2 with a feed pretreatment unit or pretreater, 4. Upstream of pretreater 4 there may be provided a takeoff conduit 6 connecting to a turbine flow meter 8, or other flow measuring device. A pretreater outlet conduit 12 fluidly connects pretreater 4 with a bottom feed conduit 16. Another flow indicator 14 may be provided in or fluidly connected to pretreater outlet conduit 12. A second control valve CV2 controls flow of pretreated feed through pretreater 4, and a third control valve CV3, normally closed, controls backwash through pretreater 4. A fourth control valve, CV4, normally closed, would allow feed to a top feed conduit 46. Control valve CV5 controls flow of pretreated feed in bottom feed conduit 16. Bottom feed conduit 16 has four bottom feed takeoff conduits 18, 20, 22, and 24, which fluidly connect bottom feed conduit 16 with membrane modules 26, 28, 30, and 32, respectively, through an eighth control valve, CV8, when control valves CV6 and CV7 are closed. The latter two control valves CV6 and CV7 are in a clean-in-place (CIP) feed conduit, 48. Membrane modules 26, 28, 30, and 32 form row 1 (R1) of a system train, which in embodiment 100 has three additional rows, row 2 (R2), row 3 (R3), and row 4 (R4). Rows 1-4 are arranged in parallel flow relationship in embodiment 100. Filtrate conduits 34, 36, 38, and 40 route filtrate from their respective membrane modules 26, 28, 30, and 32 to a main filtrate conduit or header or manifold 42, which also receives filtrate from R2, R3, and R4 through another conduit 44 or set of conduits. Control valve CV13 controls flow into a downstream filtrate tank or other process. Control valves CV9 and CV10 are positioned in conduit 47, which allows filtrate to be routed back through membrane modules 26, 28, 30, and 32 and used as backwash during a backwash cycle. A CIP return conduit 50 and backwash outlet conduit 52 are further provided. The 6×12 configuration illustrated schematically in FIGS. 3, 4, 5, and 6 features 6 rows (Row 1, Row 2, Row 3, Row 4, Row 5, and Row 6) of UF modules, where only Row 1 modules are visible (26, 28, 30, 32, 60, 62, 64, 66, 68, 70, 72, and 74). Filtrate collection headers (when using bottom feed) are illustrated at 34, 36, 38, 40, 41, and 43.

As noted in FIGS. 1, 2A and 2B, and 3-6, each UF train is divided into multiple rows of UF membranes utilizing the Inge T RACK configuration, resulting in more rows with fewer modules on each row than a typical UF train. Automated valves are utilized to direct feed flow into each individual row on a train or backwash out of each individual row separately. The filtrate headers for all the individual rows of modules on a train are shared. When a backwash is required, the filtrate is redirected to a single row of modules to provide the driving pressure and flow required to backwash each row individually. The system as configured in embodiment 100 employs dedicated feed pumps for each train, as the pressure needed for backwashing is typically considerably higher than needed for filtering, but at most flux rates to be used, the actual flow rate pumped should be less during backwashing. For example, targeting 135 gallons per square foot (GFD) on a much smaller portion of the membrane area simplifies sharing a single pump for both filtrate production and backwashing.

In normal operation the feed pumps feed all of the rows of single train as normal from either the top or bottom of the membrane modules. When the volume treated or time between backwashes is triggered, the system closes off the feed flow to the first row of modules and opens up that row to Waste. Then the total filtrate outlet valve closes, and the feed pumps change to a different flow rate called a "Backwash Flow" setpoint. The feed water is treated by the remaining rows of membrane modules, producing filtrate as normal, but instead of sending the filtrate to the finished water tank, the filtrate backflows in the filtrate header to one individual row set up for backwash. Each row would then backwash in this manner in succession for the set amount of time. After all the rows have backwashed, the filtrate valve opens, and the system returns to filtering operation.

There are many reasons that this type of backwash is beneficial, including, but not limited to the follow.

Removing large backwash pumps and large diameter piping required to handle the high backwash flow rates needed in a conventional system, as processes and systems of the present disclosure are only backwashing a small portion of the total membrane area of the train at a time. The feed pumps and backwash pumps do not need to turn on and off on a regular basis, which causes maintenance issues over time, as in the processes and systems of the present disclosure the pump is operating all the time.

The feed pump can be dedicated to each train on a VFD (variable flow drive), and operate very efficiently with that pump, with no pump shutdowns needed in normal operations.

The cost savings for removal of a backwash system, with the large tank, pumps, piping, and valves needed on a typical UF system more than compensates for the added cost of the additional valves and programming needed for processes and systems of the present disclosure.

Potential negatives to the type of backwash in the processes and systems of the present disclosure are as follows.

Processes and systems of the present disclosure add control valves and associated programming of actuators to control those valves. For example, the system present in embodiment 200 (FIGS. 2A and 2B) adds (11) open/close valves to the system when compared to a standard system when isolating (6) rows for individual backwashing. For every row added (2) more valves will be needed.

All of the control valves cycle on every backwash, so there are more valves to maintain over time. High cycle valves and actuators should be used for this service.

More control valves adds to the complexity of the UF system, as all of the control valves need to be wired and plumbed for actuation and control.

The UF train is off line for a longer time as each row in a train needs to backwash for a set amount of time per row instead of all together, so backwash takes considerably longer to complete.

Embodiments such as embodiments 100, 200, and 300 may be appropriate for use on a UF system directly coupled to a downstream process that needs a certain amount of pressure to continue operating, for example, but not limited to a Reverse Osmosis (RO) system downstream of the UF system, where the feed pressure to the RO system needs to be maintained at 30 to 40 PSI to supply the RO pressure pumps with consistent water supply. In certain embodiments, for the processes and systems of the present disclosure to perform optimally, they would preferably be paired or coupled with larger scale RO systems employing UF pre-treatment, such as industrial clients or seawater desalination systems. The advantage of this type of backwash scheme in a direct coupled UF/RO system is that the filtrate backpressure is already available for backwashing individual rows of modules as the system will simply tap off of the filtrate header the flow rate that is needed to perform a backwash of the single row of modules. The length of these rows (number of membrane modules) would be configured as long as is hydraulically possible for the membrane racks, and the systems would take each row that is active off line individually, then use the filtrate pressure available to backwash that row at the prescribed backwash flow rate for the set amount of time before returning to service. The overall UF system would still be divided into "trains" for cleaning operations, which would take that whole train off line when the system needed to be chemically cleaned. This would add to the automated valves that would be needed, as the whole train would have to be isolated during these cleanings, and also to direct the cleanings flow inside the train.

The amount of membrane area needed for a coupled UF/RO system is set first by calculating the total flow demand of water to the downstream equipment (example: 10,000 GPM). This demand would also have the flow demand added to it for backwashing a single row of membranes (example: 1,000 GPM), to get the total demand of the system (example: 11,000 GPM). This demand would have to be shared by the total number of trains that would always be online to feed the downstream equipment (example: 5 online trains at all times). This is not counting the trains that are allowed to be down due to cleanings or maintenance work (example: 2 trains can be down at any given time). The total amount of membrane area online would then be impacted by the number of rows per train (example: 4), Giving the total number of active rows available (example: 5 Trains*4 Rows−(1) in Backwash=(19) rows) for filtering to the maximum flow rate needed. That means that each row will need to be able to filter that proportion (example: 11,000 GPM/19 Rows=578 GPM Each) of water to keep up with the demand. Then the system will be designed to accommodate that flow rate through the membranes as a worst case scenario.

As indicated above, processes and systems of the present disclosure removes the need for large backwash pumps, depressurizing the system, larger piping and frequent on/off operations on the trains.

Processes and systems of the present disclosure enable the use of all media types with an inside to outside filtration path, but especially membranes such as disclosed in WO2018130394A1 (published 19 Jul. 2018, assigned to BASF SE), incorporated by reference herein, which discloses membranes M, comprising A.) a carrier membrane CM, wherein said carrier membrane CM has a porous structure wherein the average pore diameter on one surface is smaller than in the rest of the membrane, thus forming rejection layers R on one side of carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM. Especially preferred are multichannel or multibore fiber membranes as disclosed in the 394 application and other patents and published patent applications.

In certain embodiments the membrane modules may employ same or different membranes M, wherein the membrane M has a molecular weight cut-off above 3,000 Da and comprises A. a carrier membrane CM, wherein said carrier membrane CM has a porous structure wherein the average pore diameter on one surface is smaller than in the rest of the membrane, thus forming rejection layers R on one side of carrier membrane CM, and B. an active layer A comprising at least one polymer P selected from linear or branched polyethyleneimine (PEI), wherein said active layer A is located on the surfaces of the rejection layers R of carrier membrane CM and throughout the porous structure of carrier membrane CM.

In certain embodiments the membrane modules may employ same or different membranes M comprising A. a carrier membrane CM, wherein said carrier membrane CM has a porous structure wherein the average pore diameter on one surface is smaller than in the rest of the membrane, thus forming rejection layers R on one side of carrier membrane CM, and B. an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM, wherein the membrane M has preferably a molecular weight cut-off above 3,000 Da.

As defined by BASF SE, "throughout the porous structure" in the context of these membranes means that the active layer L has at least partly penetrated into the porous structures of the carrier membrane CM from the surface of carrier membrane CM where the rejection layer R is located. In the context of this application a membrane shall be understood to be a thin, semipermeable structure capable of separating two fluids or separating molecular and/or ionic components or particles from a liquid. A membrane acts as a selective barrier, allowing some particles, substances or chemicals to pass through, while retaining others.

The treatment of the aqueous system with the membrane M is usually a filtration of the aqueous system. Methods for filtration are known to an expert.

Preferably, carrier membrane CM is a hollow fiber membrane having one or more channels with an inside with an inner surface and an outside with an outer surface and wherein rejection layer R is formed on the inside or on the outside of carrier membrane CM.

Preferably, carrier membranes CM comprise as its main component at least one polymer selected from polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphonyleneesulfone, or polyethersulfone, or mixtures thereof.

In particular, the carrier membrane CM comprises as its main component at least one polymer selected from polysulfone, polyphenylenesulfone, polyethersulfone, or mixtures thereof. The term "main component" with regard to the polymer component in a membrane usually means that the membrane comprises at least 50 wt %, preferably at least 80 wt %, and in particular at least 90 wt % of the respective polymer. For example, carrier membranes CM can be ultrafiltration (UF) membranes or microfiltration (MF) membranes, wherein UF membranes are preferred. These membrane types are generally known in the art and are further described below. Usually, the membrane M, such as the ultrafiltration membrane, has a molecular weight cut-off (MWCO) above 3,000 Da, preferably above 7,000 Da, and in particular above 10,000 Da. The molecular weight cut-off may be determined with polyethyleneglycol solutions of known molar mass, e.g. as described in the experimental part. UF membranes are normally suitable for removing suspended solid particles and solutes of high molecular weight, for example above 10,000 Da. In particular, UF membranes are normally suitable for removing bacteria and viruses. UF membranes normally have an average pore diameter of 2 nm to 50 nm, preferably 5 to 40 nm, more preferably 5 to 20 nm.

In one embodiment, UF membranes comprise as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, polyetherimide (PEI), Polyetheretherketone (PEEK), sulfonated polyetheretherketone (SPEEK), Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone, or polyethersulfone, or mixtures thereof.

In another embodiment of the invention, UF membranes comprise as the main component at least one polysulfone, polyphenylenesulfone and/or polyethersulfone. "Polysulfones", "polyethersulfones" and "polyphenylenesulfones" shall include the respective polymers that comprise sulfonic acid and/or salts of sulfonic acid at some of the aromatic moieties.

In one embodiment, UF membranes comprise as the main component or as an additive at least one partly sulfonated polysulfone, partly sulfonated polyphenylenesulfone and/or partly sulfonated polyethersulfone. In one embodiment, UF membranes comprise as the main component or as an additive at least one partly sulfonated polyphenylenesulfone.

"Arylene ethers", "Polysulfones", "polyethersulfones" and "polyphenylenesulfones" shall include block polymers that comprise blocks of the respective arylene ethers, polysulfones, polyethersulfones or polyphenylenesulfones as well as other polymer blocks.

In one embodiment, UF membranes comprise as the main component or as an additive at least one block copolymer of at least one arylene ether and at least one polyalkylene oxide. In one embodiment, UF membranes comprise as the main component or as an additive at least one block copolymer of at least one polysulfone or polyethersulfone and at least one polyalkylene oxide like polyethylene oxide, In one embodiment, UF membranes comprise further additives like polyvinyl pyrrolidones or poly-alkylene oxides like polyethylene oxides. In a preferred embodiment, UF membranes comprise as major components polysulfones, poly-phenylenesulfone or polyethersulfone in combination with additives like polyvinylpyrrolidone. In one preferred embodiment, UF membranes comprise 99.9 to 50% by weight of a combination of polyethersulfone and 0.1 to 50% by weight of polyvinylpyrrolidone. In another embodiment UF membranes comprise 95 to 80% by weight of polyethersulfone and 5 to 20% by weight of polyvinylpyrrolidone.

In one embodiment of the invention, UF membranes are present as spiral wound membranes, as pillows or flat sheet membranes. In another embodiment of the invention, UF membranes are present as tubular membranes. In another embodiment of the invention, UF membranes are present as hollow fiber membranes or capillaries. In yet another embodiment of the invention, UF membranes are present as single bore hollow fiber membranes. In yet another embodiment of the invention, UF membranes are present as multibore hollow fiber membranes. Multiple channel membranes, also referred to as multibore membranes, comprise more than one longitudinal channels also referred to simply as "channels". In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels. In another embodiment the number of channels is 20 to 100. The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter. In some cases, the actual form of such channels may deviate from the idealized circular, ellipsoid or rectangular form. Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm.

For channels with an essentially rectangular shape, these channels can be arranged in a row. For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel. The wall thickness in such multiple channel membranes is normally from 0.02 to 1 mm at the thinnest position, preferably 30 to 500 mg, more preferably 100 to 300 mg. Normally, the membranes according to the invention and carrier membranes have an essentially circular, ellipsoid or rectangular diameter. Preferably, membranes according to the invention are essentially circular.

In one preferred embodiment, membranes according to the invention have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm. In another preferred embodiment, membranes according to the invention have a diameter (for essentially circular diameters), smaller diameter (for essentially ellipsoid diameters) or smaller feed size (for essentially rectangular diameters) of 2 to 4 mm.

In one embodiment the rejection layer is located on the inside of each channel of said multiple channel membrane.

In one embodiment multibore membranes are designed with pore sizes between 0.2 and 0.01 μη. In such embodiments the inner diameter of the capillaries can lie between 0.1 and 8 mm, preferably between 0.5 and 4 mm and particularly preferably between 0.9 and 1.5 mm. The outer diameter of the multibore membrane can for example lie between 1 and 26 mm, preferred 2.3 and 14 mm and particularly preferred between 3.6 and 6 mm. Furthermore, the multibore membrane can contain 2 to 94, preferably 3 to 19 and particularly preferred between 3 and 14 channels. Often multibore membranes contain seven channels. The permeability range can for example lie between 100 and 10000 L/m$^2$ hbar, preferably between 300 and 2000 L/m$^2$ hbar.

Typically multibore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol. MF membranes are normally suitable for removing particles with a particle size of 0.1 μη and above. Microfiltration systems are usually designed to remove suspended solids down to 0.1 micrometers in size, in a feed solution with up to 2-3% in concentration.

MF membranes normally have an average pore diameter of 0.05 mg to 10 μη preferably 1.0 mg to 5 μη.

Microfiltration can use a pressurized system but it does not need to include pressure.

MF membranes can be capillaries, hollow fibers, flat sheet, tubular, spiral wound, pillows, hollow fine fiber or track etched. They are porous and allow water, monovalent species (Na+, Cl−), dissolved organic matter, small colloids and viruses through but retain particles, sediment, algae or large bacteria.

In one embodiment, MF membranes comprise as the main component at least polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, polyetherimide (PEI), Polyetheretherketone (PEEK), sulfonated polyetheretherketone (SPEEK), Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone or polyethersulfone, or mixtures thereof. In another embodiment of the invention, MF membranes comprise as the main component at least one polysulfone, polyphenylenesulfone and/or polyethersulfone.

In one embodiment, MF membranes comprise as the main component at least one partly sulfonated polysulfone, partly sulfonated polyphenylenesulfone and/or partly sulfonated polyethersulfone. In one embodiment, MF membranes comprise as the main component at least one partly sulfonated polyphenylenesulfone.

In one embodiment, MF membranes comprise as the main component or as an additive at least one block copolymer of at least one arylene ether and at least one polyalkylene oxide. In one embodiment, MF membranes comprise as the main component or as an additive at least one block copolymer of at least one polysulfone or polyethersulfone and at least one polyalkylene oxide like polyethylene oxide. Membranes suitable as carrier membranes CM are preferably hollow fiber membranes. Carrier membranes CM can have one or more channels with an inside and with an outside. Carrier hollow fiber membranes CM have an inner surface on the inside and an outer surface on the outside.

Hollow fiber membranes having more than one channel are also referred to a multibore membranes or multichannel or multiple channel membranes.

Multiple channel membranes, comprise more than one longitudinal channels also referred to simply as "channels". In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels. In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter. In some cases, the actual form of such channels may deviate from the idealized circular, ellipsoid or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm. For channels with an essentially rectangular shape, these channels can be arranged in a row. For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel.

The wall thickness in such multiple channel membranes is normally from 0.02 to 1 mm at the thinnest position, preferably 30 to 500 μm, more preferably 100 to 300 μm.

Normally, the hollow fiber membranes M and carrier membranes CM have an essentially circular, ellipsoid or rectangular diameter. Preferably, carrier membranes CM are essentially circular. In one preferred embodiment, carrier membranes CM have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm. In another preferred embodiment, carrier membranes CM have a diameter (for essentially circular diameters), smaller diameter (for essentially ellipsoid diameters) or smaller feed size (for essentially rectangular diameters) of 2 to 4 mm.

In one embodiment the rejection layer R is located on the inside of each channel of said multiple channel membrane.

In one embodiment the rejection layer R is located on the outside of said multiple channel membrane.

In one embodiment multibore membranes are designed with pore sizes in the rejection layer R between 0.2 and 0.01 μm. In such embodiments the inner diameter of the capillaries can lie between 0.1 and 8 mm, preferably between 0.5 and 4 mm and particularly preferably between 0.9 and 1.5 mm. The outer diameter of the multibore membrane can for example lie between 1 and 26 mm, preferred 2.3 and 14 mm and particularly preferred between 3.6 and 6 mm. Furthermore, the multibore membrane can contain 2 to 94, preferably 3 to 19 and particularly preferred between 3 and 14 channels. Often multibore membranes contain seven channels. The permeability range can for example lie between 100 and 10000 L/m² hbar, preferably between 300 and 2000 L/m² hbar.

Typically multibore membranes CM of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

Membranes M comprise an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag. Said active layer A is located on the surfaces of the rejection layers R of carrier membrane CM and throughout the porous structure of carrier membrane CM. "Stable complexes" in this context shall mean that they bind at least one of the respective metal ions at room temperature at a pH of 4 to 8 in water.

Suitable functional groups G capable of forming stable complexes with metal ions include primary amino groups, secondary amino groups, carboxylic acid salts, sulfonic acid salts, hydroxyl groups.

In one embodiment, active layer A is obtained from at least one polymer P that has optionally been crosslinked with at least one crosslinker V, wherein said polymer P is selected from linear or branched polyethyleneimine PEI, polyalkylenepolyamine, thiol-based polyethylenimine PEI, melamine based polyamines, polyetheramine, polyvinylamine, polyamidoamine, quarternary amine based polymers like Polydiallyldimethylammonium chloride (polyDADMAC), polyacrylic acid or salts thereof, polydiallyl-dimethyl-ammonium chloride, humic substances, carboxyl methyl cellulose, copolymers of acrylic acid and other ethylenically unsaturated compounds like maleic acid.

In another form a suitable polymer P that has optionally been crosslinked with at least one cross-linker V, is selected from linear or branched polyethyleneimine PEI, polyalkylenepolyamine, thiol-based polyethylenimine PEI, melamine based polyamines, polyetheramine, polyvinylamine, polyamidoamine, quarternary amine based polymers like Polydiallyldimethylammonium chloride (polyDADMAC), polyacrylic acid or salts thereof, polydiallyl-dimethyl-ammonium chloride, humic substances, carboxyl methyl cellulose, copolymers of acrylic acid other ethylenically unsaturated compounds like maleic acid. In a preferred form the polymer P that has optionally been crosslinked with at least one crosslinker V, is selected from linear or branched polyethyleneimine PEI.

In another form membranes M comprise the active layer A comprising at least one polymer P. Preferably, the membranes M comprise the active layer A comprising at least one polymer P selected from linear or branched polyethyleneimine PEI.

Crosslinker V comprises one or more functional groups capable of reacting with functional groups present in polymer P under formation of covalent bonds. In one embodiment crosslinker V comprises more than one functional groups capable of reacting with functional groups present in polymer P under formation of covalent bonds. In one embodiment crosslinker V comprises two or more functional groups capable of reacting with functional groups present in polymer P under formation of covalent bonds.

Preferably, crosslinker V comprises three or more functional groups capable of reacting with functional groups present in polymer P under formation of covalent bonds. The term "capable of reacting with functional groups present in polymer P" shall be understood to mean that such crosslinkers V react with functional groups present in polymer P under conditions as they are applied for preparing active layer A under the formation of an atomic (covalent) bond. In one embodiment, active layer A is obtained from at least one crosslinker V and at least one polyethyleneimine PEI. In this case crosslinker V comprises functional groups F capable of reacting with primary or secondary amino groups.

The term "capable of reacting with amino groups" shall be understood to mean that such functional groups F react with amino groups under conditions as they are applied for preparing active layer A under the formation of an atomic bond between said functional groups capable of reacting with amino groups and said amino groups.

In another form the crosslinker V comprises functional groups F which are acyl groups. Examples of functional groups F include acyl halide groups like acyl chloride, ester groups and carboxylic acid anhydride groups, aldehydes and isocyanates.

Preferably crosslinker V comprises three functional groups F per molecule. In one embodiment crosslinker V comprises more than three functional groups F per molecule. In one embodiment crosslinker V comprises four functional groups F per molecule.

Preferred crosslinkers V include trimesoylchloride, phthaloyl chloride (1,2-benzenedicarbonyl chloride), isophthaloyl chloride (1,3-benzenedicarbonyl chloride), terephthaloyl chloride (TCL, 1,4-benzenedicarbonyl chloride), mm-Biphenyl tetraacyl chloride (mm-BTEC), om-Biphenyl tetraacyl chloride (om-BTEC), op-Biphenyl tetraacyl chloride (op-BTEC), 5-chloroformyl oxy-isophthaloyl chloride (CFIC), cyanuric chloride glutaryl chloride, hexafluoroglutaryl chloride, glutaraldehyde, formaldehyde, acetaldehyde, propionaldehyde, butyraldehyde, benzaldehyde, glucose, imidazolate-2-carboxyaldehyde, iso-phthalaldehyde, ortho-phthaldialdehyde and terephthalaldehyde.

Polyethyleneimines PEI are polymers with repeating units composed of an amine group and two carbon aliphatic CH2CH2 spacer. Linear polyethyleneimines PEI contain all secondary amines (with the exception of the terminal positions), in contrast to branched polyethyleneimines PEI which contain primary, secondary and tertiary amino groups. Branched Polyethyleneimines PEI can in certain embodiments be in a hyper branched or dendrimeric form that is entirely branched.

The composition of polyethyleneimines PEI can in one embodiment be expressed by the following general molecular formula:

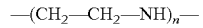

with $10 < n < 10^5$.

Suitable polyethyleneimines PEI can be linear, branched or dendrimeric. Preferably, polyethyleneimines PEI is branched. Suitable polyethyleneimines PEI are for example available from BASF under the trade name Lupasol®. Branched polyethyleneimines PEI can be prepared by ring opening polymerization of aziridine. In one embodiment, polyethyleneimines PEI is prepared as disclosed in US 2014/163199 in [0014] to [0031]. In one embodiment, polyethyleneimines PEI is prepared as disclosed in U.S. Pat. No. 8,697,834 col 2, ln 53 to col 9 ln 26.

Polyethyleneimine PEI normally have an average molecular weight Mw of 500 to 1,000,000 g/mol (all Mw of PEI given herein are determined by GPC at pH 4.5; solvent THF, Mw determined by comparison over polystyrene standard). In one embodiment, polyethyleneimines PEI have an average molecular weight Mw of 500 to 1500. In one embodiment, polyethyleneimines PEI have an average molecular weight Mw of 1501 to 50,000. In one embodiment, polyethyleneimines PEI have an average molecular weight Mw of 50,001 to 1,000,000. Preferably, polyethyleneimines PEI have a molecular weight Mw of 600 to 1000, more preferably 700 to 900. In one embodiment polyethyleneimines PEI have a molecular weight Mw of 800 to 1000. In one embodiment polyethyleneimines PEI have a molecular weight Mw of between 400 and 10,000 Da.

Polyethyleneimines PEI normally have a viscosity of more than 3000 (water content 1% according to DIN 53715, K. Fischer; concentration 99% according to ISO 3251; viscosities herein are according to Brookfield, ISO 2555 and given in [mPa s]). In one embodiment, polyethyleneimines PEI have a viscosity of 3000 to 10,000, preferably 4000 to 9000 (water content 1% according to DIN 53715, K. Fischer; concentration 99% according to ISO 3251). In one embodiment, polyethyleneimines PEI have a viscosity of 10,001 to 100,000 (water content 1% according to DIN 53715, K. Fischer; concentration 99% according to ISO 3251). In one embodiment, polyethyleneimine PEI have viscosity higher than 100,000 or 200,000 (water content 1% according to Dl N 53715, K. Fischer; concentration 99% according to ISO 3251). Preferably, polyethyleneimines PEI have a viscosity of 3000 to 7000, more preferably 4000 to 6000 (water content 1% according to DIN 53715, K. Fischer; concentration 99% according to ISO 3251). In one embodiment, polyethyleneimines PEI have a viscosity of 100 to 500, preferably 200 to 450 (water content 50% according to DIN 53715, K. Fischer; concentration 50% according to ISO 3251). In one embodiment, polyethyleneimines PEI have a viscosity of 501 to 15,000 (water content 50% according to DIN 53715, K. Fischer; concentration 50% according to ISO 3251). In one embodiment, polyethyleneimines PEI have viscosity higher than 15,001 (water content 50% according to DIN 53715, K. Fischer; concentration 50% according to ISO 3251). In one embodiment, polyethyleneimines PEI have viscosity from 15,001 (water content 50% according to DIN 53715, K. Fischer; concentration 50% according to ISO 3251) to 800 (water content 76% according to DIN 53715, K. Fischer; concentration 24% according to ISO 3251). Preferably, polyethyleneimines PEI has a viscosity of 200 to 450 (water content 50% according to DIN 53715, K. Fischer; concentration 50% according to ISO 3251).

Active layer A can be located on the inner surfaces or on the outer surface of carrier membranes CM. In one embodiment, active layer A is located on the inner surfaces of carrier membranes CM. In one embodiment, active layer A is located on the outer surface of carrier membranes CM.

In one embodiment, active layer A is prepared by preparing the reaction product of at least one crosslinker V and at least one polymer P, wherein said crosslinker V comprises functional groups F capable of reacting with functional groups present in polymer P, and applying said readily prepared reaction product onto the surface of carrier membrane CM. This can for example be done by applying a solution of said reaction product onto the surface of carrier membrane CM and removing the solvent.

In one embodiment, active layer A is prepared by preparing the reaction product of at least one crosslinker V and at least one polyethyleneimine PEI, wherein said crosslinker V comprises functional groups F capable of reacting with amino groups, and applying said readily prepared reaction product onto the surface of carrier membrane CM. This can for example be done by applying a solution of said reaction product onto the surface of carrier membrane CM and removing the solvent. In one embodiment, active layer A is prepared in situ on the surface of carrier membrane CM. This can for example be done by first applying crosslinker V onto the surface and bringing it in contact with a solution of polymer P in a separate step. In a preferred embodiment, active layer A is prepared in situ on the surface of carrier membrane CM. This can for example be done by first applying crosslinker V onto the surface and bringing it in contact with a solution of polyethyleneimine PEI in a separate step. In a another embodiment, active layer A is prepared in situ on the surface of carrier membrane CM by first applying a solution of polyethyleneimine PEI onto the surface and bringing it in contact with crosslinker V in a separate step.

Certain systems may include flow management components and associated components, for example, but not limited to pressure (or vacuum, or reduce pressure) control devices (backpressure valves), pressure relief devices (valves or explosion discs), level control valves, expansion valves, pipes, conduits, vessels, tanks, mass flow meters, temperature and pressure indicators, heat exchangers, pumps, compressors, and blowers as described herein.

Certain processes and systems of this disclosure include those wherein the one or more membrane modules use UF elements known under the trade designation DIZZER® or DIZZER® P, and multichannel polymeric fibers known under the trade designation MULTIBORE®, all available from Inge/BASF. Some characteristics are provided in Tables 1 and 2 (where ® designates registered trademarks of BASF).

TABLE 1

Membrane modules 4 inch UF modules with Multibore ® 0.9 membrane

| Module data | | | dizzer ® P4040-6.0 | | dizzer ® P4021-2.5 | |
| --- | --- | --- | --- | --- | --- | --- |
| Part number | | | VK-0049 | | VK-0048 | |
| Membrane area | m² | sq. ft. | 6.0 | 65 | 2.5 | 27 |
| Length (L) | mm | inch | 960 ± 1.5 | 37.8 | 475 ± 1.5 | 18.7 |
| Outer diam. module (D) | mm | inch | 100 | 3.94 | 100 | 3.94 |
| Inner diam. module (d1) | mm | inch | 28.4 | 1.12 | 28.4 | 1.12 |
| Shipping weight (wet) | kg | lbs. | 4.5 | 10 | 2.3 | 5 |

4 inch UF modules with Multibore ® 1.5 membrane

| Module data | | | dizzer ® P4040-6.0 | | dizzer ® P4021-2.5 | |
| --- | --- | --- | --- | --- | --- | --- |
| Part number | | | VK-0051 | | VK-0050 | |
| Membrane area | m² | sq. ft. | 4.0 | 43 | 1.8 | 19.4 |
| Length (L) | mm | inch | 960 ± 1.5 | 37.8 | 475 ± 1.5 | 18.7 |
| Outer diam. module (D) | mm | inch | 100 | 3.94 | 100 | 3.94 |
| Inner diam. module (d1) | mm | inch | 28.4 | 1.12 | 28.4 | 1.12 |
| Shipping weight (wet) | kg | lbs. | 4.5 | 10 | 2.3 | 5 |

TABLE 2

Multichannel fiber membranes

Multibore ® 0.9 membrane data

| Capilliaries per fibre | | | 7 | |
| --- | --- | --- | --- | --- |
| Inside diam. of capillaries | mm | | 0.9 | |
| Pore size | µm | | approx. 0.02 | |
| Burst pressure | bar | psi | >10 | >150 |
| Material | | | PESM | |
| Mode of operation | | | In-to-Out-filtration | |

Multibore ® 1.5 membrane data

TABLE 2-continued

Multichannel fiber membranes

| Capilliaries per fibre | | | 7 | |
|---|---|---|---|---|
| Inside diam. of capillaries | mm | | 1.5 | |
| Pore size | μm | | approx. 0.02 | |
| Burst pressure | bar | psi | >10 | >150 |
| Material | | | PESM | |
| Mode of operation | | | In-to-Out-filtration | |

Techncal information

| Operating parameters | Multibore ® 0.9 and 1.5 membrane | | | |
|---|---|---|---|---|
| Max. TMP filtration | bar | psi | 3.0 | 43.5 |
| Permissible temp. range* | ° C. | ° F. | 1-40 | 34-104 |
| Cleaning/disinfection chemicals | | | | |
| NaClO | ppm | | max. 500 | |
| | ppm × h | | max. 250,000 (at pH ≥ 9.5) | |
| $H_2O_2$ | ppm | | max. 500 | |
| Caustic soda pH | | | max. 13 | |
| Acid pH | | | min. 1 | |

*To avoid mechancical damage, do not subject the membrane module or element to sudden temperature changes (>1° C./min) or water hammers.

In certain of systems, the one or more membrane modules may comprise a body having a length (L), an outside diameter (D), and a longitudinal axis (LA). It is understood herein that the term "length" is a larger numerical quantity than the term "outside diameter."

Certain systems of the present disclosure may further comprise a cleaning composition supply vessel, a cleaning composition supply conduit fluidly connecting the cleaning composition supply vessel with the pump, and a cleaning composition supply valve in the cleaning composition supply conduit.

In certain processes and systems of this disclosure, efficiency of filtration may be characterized by turbidity and silt density index (SDI) of the filtrate. SDI is a measurement of the fouling potential of suspended solids, and may be determined by test method ASTM D4189-07(2014). Acceptable values depend on the filter media and even the filter media manufacturer of the "same" media, as well as temperature of the water being tested. Turbidity is a measurement of the amount of suspended solids. SDI and turbidity are not the same and there is no direct correlation between the two. According to the Water Treatment Guide, a publication of Applied Membranes, Inc., in practical terms, however, many filter media show very little fouling when the feed water has a turbidity of less than 1 NTU. Correspondingly these filter media show very low fouling at a feed SDI of less than 5. SDI may be reduced by injecting a coagulant that is compatible with the filter media, before the media filter. A dispersant may keep particles from fouling the media.

A wide variety of probes are available to measure turbidity—the degree to which light is scattered by particles suspended in a liquid. The measured turbidity, however, depends on the wavelength of light and the angle at which the detector is positioned. Turbidity values of the effluent (filtrate) may range from about 0.0005 to about 800 NTU, or from about 0.0010 to about 700 NTU, or from about 0.0020 to about 650 NTU, or from about 0.0050 to about 600 NTU, or from about 0.01 to about 500 NTU. "NTU" refers to "Nephelometric Turbidity Unit" (NTU) and employs a sensor that measures scattered light at 90 degrees from an incident white light beam, according to EPA method 180.1.

One system embodiment may comprise, for example, a first UF train using a first rating, a second UF train using a second rating, and so on, using substantially the same machine design for each UF train, where the rating (rejection size) decreases from the first to successive UF trains.

The condition (clarity, turbidity, and/or concentration of an impurity) and flow rate of the influent (feed) stream and the specific configuration of the system largely define the operational capabilities of each process and system embodiment. Redundancy of components (pumps, valves, sensors, and the like) may allow for extended service periods and mitigates risk of downtime due to component failure. An example would be a control valve plugging with material, or malfunctioning, or a pump failure, or a pump taken out of service for inspection. In this case, isolating the failed or to be inspected component and enabling another one allows for continued operations, and enables evaluation and/or modification of the operational parameters to minimize the risk of failure of the new or parallel components in use.

The processes and systems of this present disclosure may be used for new greenfield applications, where one or more filter units are custom designed together to be operatively and fluidly connected during operation. It is also contemplated to design the processes and systems to be able to operate in dual modes, where in the first mode one or more UF trains are integrated with another process (such as a clarifier or other type of membrane unit), and the second mode where one or both of the units may operate independently from each other, in other words, where either one or both of the UF train(s) filter unit and the clarifier or other unit may operate without requiring the other unit to be in operation.

Certain embodiments may include 1) low power electric connections for data transmission for sensors (e.g., pressure, temperature, mass flow indicators, particle counters, among others); and 2) electric cable to provide power for operating valves and other components of the processes and systems. With respect to data connection/integration, in certain embodiments control signals for the components of the systems of the present disclosure, as well as parameters measured or captured by the system's sensors, may be transmitted to and from an operator room or control room from and to the filter.

Any known type of pump may be employed in practicing the processes and systems of the present disclosure, including those driven by variable-frequency drives (VFD), such as currently commercially available from Grundfos, Invertek, ABB, Eaton, Lenze and others. Any known type of pump may be employed in practicing the processes and systems of the present disclosure, including positive displacement, centrifugal, horizontal, vertical pumps, and particularly pumps operated with variable speed motors. Suitable conduits and components typically used therewith include currently commercially available stainless steel tubing, or PVC tubing available from a variety of sources, including Ryan Herco, J M Eagle, Charlotte Pipe, Cresline, and others. Any known type of mass flow meter may be employed in practicing the processes and systems of the present disclosure. Suitable mass flow meters and components typically used therewith include the coriolis flow and density meters currently commercially available from Emerson (under the trade designation ELITE Peak Performance Coriolis Flow and Density Meter) and other suppliers.

During certain processes of the present disclosure, one or all of temperature, mass flow rate, concentrations (or percentages of set point values) of selected constituents of influent and/or effluent; and reduced pressure value of one or more cleaning members, and other parameters may be displayed locally on one or more Human Machine Interfaces (HMI), such as a laptop computer having a display screen having a graphical user interface (GUI), or handheld device, or similar, either in a dedicated control room, or remotely. In certain embodiments the HMI may record and/or transmit the data via wired or wireless communication to another HMI, such as another laptop, desktop, or hand-held computer or display. These communication links may be wired or wireless.

The membrane modules (vessel, heads, media, and media support structure), conduits, and control valves may be made of metals, polymeric materials (for example, but not limited to, polypropylene, PVC, fiber-reinforced plastic (FRP)), except where felt or fabric seals, or rubber or other polymeric materials and/or seals may be employed. Suitable metals include stainless steels, for example, but not limited to, 304, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight. Threaded connections may eliminate the need for $3^{rd}$ party forgings and expensive welding processes—considerably improving system delivery time and overall cost. It will be understood, however, that the use of $3^{rd}$ party forgings and welding is not ruled out for system components described herein and may actually be preferable in certain situations. The skilled artisan, having knowledge of the particular application, pressures, temperatures, and available materials, will be able design the most cost effective, safe, and operable system components for each particular application without undue experimentation.

One or more control strategies may be employed in controlling the systems and/or processes described herein. A pressure process control scheme may be employed, for example in conjunction with the control valve controllers. A master controller may be employed, but the disclosure is not so limited, as any combination of controllers may be used. Programmable logic controllers (PLCs) may be used.

Control strategies may be selected from proportional-integral (PI), proportional-integral-derivative (PID) (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The electrical connections, if used (voltage and amperage) will be appropriate for the zone rating desired of each system. In certain embodiments one or more electrical cables may be run and connected to an identified power supply at the work site to operate the HMI filter unit motor, pump, control valves, and pressure reducing device. Certain embodiments may employ a dedicated power supply. The identified or dedicated power supply may be controlled by one or more logic devices so that it may be shut down. In exemplary embodiments, systems of the present disclosure may have an electrical isolation (lockout) device on a secure cabinet.

In embodiments where connection to one or more remote HMI units is desired, this may be achieved by an intrinsically safe cable and connection to allow system components to operate in the required zoned area. If no remote access is required, power to operate the HMI, motor, pump, and control valves may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) processes). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

In certain embodiments, internal algorithms in the logic device, such as a PLC, may calculate a rate of increase or decrease in pressure inside the membrane modules, or increase in pressure differential across filter media. These may then be displayed or audioed in a series of ways such as "percentage to backwash" lights or sounds, and the like on one or more GUIs. In certain embodiments, an additional function within an HMI may be to audibly alarm when the calculated tank water level and/or pressure differential across the filter media rate of increase or decrease reaches a level set by the operator. In certain embodiments this alarm may be emitted locally, as well as remote from the filter system, for example in a local or remote control room.

Systems of the present disclosure, including conduits therefore, control valves, pumps, logic devices, sensors, and optional safety shutdown units should be capable of withstanding long term exposure to probable liquids and vapors, including hydrocarbons, acids, acid gases, fluids (oil-based and water-based), solvents, brine, anti-freeze compositions, hydrate inhibition chemicals, biocides, chlorine, and the like, typically encountered in water and wastewater filtering and treatment facilities.

In alternative embodiments, some or all of the system may be enclosed within a frame or cabinet, and/or skid-mounted, and/or truck-mounted, and/or ship-mounted. Moreover, the various components (such as the filter tank) need not have specific shapes or specific conduit routing as illustrated in the drawings, but rather could take any shape, such as a box or cube shape, elliptical, triangular, prism-shaped, hemispherical or semi-hemispherical-shaped (dome-shaped), or combination thereof and the like, as long as the system performs the desired separation. The conduit cross-sections need not be round, but may be rectangular, triangular, round, oval, and the like. It will be understood that such embodiments are part of this disclosure and deemed with in the claims. Components of the systems may include optional hand-holds, which may be machined or formed to have easy-to-grasp features for fingers, or may have rubber grips shaped and adorned with ornamental features, such as raised knobby gripper patterns.

From the foregoing detailed description of specific embodiments, including the flow rates, equipment, pressures, and other information included in FIGS. 2-6, it should be apparent that patentable systems, combinations, and processes have been described. Although specific embodiments of the disclosure have been described herein in some detail, this has been done solely for the purposes of describing various features and aspects of the processes and systems and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to modify, add to, or retrofit an existing water or wastewater treatment facility to include one or more systems of this disclosure. Certain processes and systems of this disclosure may be devoid of certain steps, components and/or features: for example, systems devoid of more than one pump; systems devoid of exotic metals; systems devoid of low-strength steels; systems devoid of threaded fittings; systems devoid of welded fittings; processes devoid of a separation step upstream or downstream of the UF train(s) of the present disclosure.

What is claimed is:

1. A water or wastewater filtration system comprising:
   a) a plurality of membrane modules, each having one of a plurality of filter media therein, the plurality of membrane modules arranged in parallel fluid flow,
   b) a main bottom feed conduit;
   c) a main top feed conduit;
   d) separate feed conduits fluidly connecting the main bottom feed conduit and the main top feed conduit to respective ones of the plurality of membrane modules,
   e) a main filtrate conduit, and separate filtrate conduits fluidly connecting respective ones of the plurality of membrane modules to the main filtrate conduit;
   f) the main filtrate conduit and the separate filtrate conduits configured to serve, during a backwash operation, as a main backwash conduit and separate backwash conduits fluidly connecting the main backwash conduit to respective ones of the plurality of membrane modules;
   g) a single pump having a pump feed conduit, a cleaning composition supply conduit fluidly connected to the pump feed conduit, and a pump discharge conduit, the pump discharge conduit fluidly connected to the main top feed conduit and to the main bottom feed conduit;
   h) a plurality of automatically controllable valves positioned in the main top feed conduit, the main bottom feed conduit, the main filtrate conduit, the pump discharge conduit, the cleaning composition supply conduit, and the backwash conduit;
   i) a programmable logic controller configured to actuate the plurality of automatically controllable valves to control feed flows, backwash flows, and cleaning composition flow through the plurality of membrane modules using pressure developed only by the pump; and
   j) a variable-speed prime mover for operating the pump.

2. The system of claim 1 wherein each of the plurality of membrane modules is positioned substantially vertically.

3. The system of claim 1 wherein each of the plurality of membrane modules comprises a body having a length (L), a diameter (D), and a longitudinal axis (LA).

4. The system of claim 3 wherein the length (L) and diameter (D) of each of the plurality of membrane modules is equal for all of the plurality of membrane modules.

5. The system of claim 1 wherein at least some of the plurality of filter media comprise UF filter media.

6. The system of claim 5 wherein each of the UF filter media comprises multichannel or multibore polymer fiber membranes.

7. The system of claim 6 wherein the multichannel or multibore polymer fiber membranes comprise A.) a carrier membrane CM, wherein said carrier membrane CM has a porous structure having an average pore diameter on one surface smaller than in a balance of the carrier membrane, thus forming a rejection layer R on the one surface of the carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on surfaces of the rejection layer R of the carrier membrane CM and throughout the porous structure of the carrier membrane CM.

8. The system of claim 6 wherein each of the polymer fiber membranes have a molecular weight cut-off above 3,000 Da and comprise A. a carrier membrane CM, wherein said carrier membrane CM has a porous structure having an average pore diameter on one surface smaller than in a balance of the carrier membrane, thus forming a rejection layer R on the one surface of the carrier membrane CM, and B. an active layer A comprising at least one polymer P selected from linear or branched polyethyleneimine (PEI), wherein said active layer A is located on surfaces of the rejection layer R of the carrier membrane CM and throughout the porous structure of the carrier membrane CM.

9. The system of claim 1 having one or more trains of the plurality of membrane modules, each train having N rows of the plurality of membrane modules, wherein each row of the plurality of membrane modules is successively backwashed with filtrate while remaining rows operate in filtration mode, all of the plurality of membrane modules controlled by the plurality of automatically controllable valves, the programmable logic controller, the pump, and the variable-speed prime mover.

10. A water or wastewater filtration system comprising:
   a) a dedicated pump (2) configured to be used for all filtering, backwashing, and cleaning operations on individual UF system trains;
   b) the dedicated pump (2) configured to take a feed from a feed tank through a feed conduit (1), and discharge through a pump discharge conduit (10), which further includes a check valve and a first control valve (CV1);
   c) the pump discharge conduit (10) fluidly connects the dedicated pump (2) with a feed pretreatment unit or pretreater, (4);
   d) a feed pretreatment unit or pretreater outlet conduit (12) fluidly connects the feed pretreatment unit or pretreater (4) with a bottom feed conduit (16);
   e) a second control valve (CV2) configured to control flow of a pretreated feed through the feed pretreatment unit or pretreater (4), and a third control valve (CV3), normally closed, configured to control backwash through the feed pretreatment unit or pretreater (4);
   f) a fourth control valve, (CV4), normally closed, configured to allow the feed to flow to a top feed conduit (46) when open;
   g) a fifth control valve (CV5) configured to control flow of pretreated feed in the bottom feed conduit (16), wherein the bottom feed conduit (16) has four bottom feed takeoff conduits (18), (20), (22), and (24), which fluidly connect the bottom feed conduit (16) with a set of four membrane modules (26), (28), (30), and (32), respectively, through an eighth control valve, (CV8), when a sixth control valve (CV6) and a seventh control valve (CV7) are closed, the sixth control valve (CV6)

and the seventh control valve (CV7) configured to be open during a clean-in-place (CIP) operation utilizing the dedicated pump and a CIP conduit, (48);

h) the set of membrane modules (26), (28), (30), and (32) form a first row (R1) of a system train, the system train having three additional rows, a second row (R2), a third row (R3), and a fourth row (R4) arranged in parallel flow relationship;

i) a set of filtrate conduits (34), (36), (38), and (40) configured to route a filtrate from the set of membrane modules (26), (28), (30), and (32) to a main filtrate conduit, header, or manifold (42), which also receives the filtrate from the second row (R2), the third row (R3), and the fourth row (R4) through another conduit (44);

j) a thirteenth control valve (CV13) configured to control flow of the filtrate into a downstream filtrate tank or other process;

k) a ninth control valve (CV9) and a tenth control valve (CV10) positioned in a backwash conduit (47), configured to route the filtrate back through the set of membrane modules (26), (28), (30), and (32) and use the filtrate as backwash during a backwash cycle forming backwash effluent that exits the system through the four bottom feed takeoff conduits (18), (20), (22), and (24), the feed conduit (16), and a backwash outlet conduit (52) until the backwash effluent is substantially clean; and l) a CIP return conduit (50) and a backwash effluent outlet conduit (52).

11. The system of claim 10 further comprising a variable-speed drive for the dedicated pump.

12. The system of claim 11 wherein the variable-speed drive is a variable frequency drive.

13. A process for treating water or wastewater using the system of claim 1, comprising:
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

14. A process for treating water or wastewater using the system of claim 2,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

15. A process for treating water or wastewater using the system of claim 5,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

16. A process for treating water or wastewater using the system of claim 6,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

17. A process for treating water or wastewater using the system of claim 7,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

18. A process for treating water or wastewater using the system of claim 8,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

19. A process for treating water or wastewater using the system of claim 9,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and
    c) backwashing a first portion of the plurality of membrane modules while a second portion of the plurality of membrane modules operate in filtration mode, using only the pump for pressure during filtration and backwashing operations.

20. A process for treating water or wastewater using the system of claim 10,
    a) flowing a feed water composition comprising water and impurities into the plurality of membrane modules;
    b) producing a filtrate stream by generating a pressure differential across the plurality of filter media, causing water in the feed water composition to flow from inside to outside of the plurality of filter media; and c) backwashing a first portion of the plurality of membrane modules while a second portion of the plurality of membrane modules operate in filtration mode, using only the pump for pressure during filtration and backwashing operations.

* * * * *